United States Patent
Huang et al.

(10) Patent No.: US 12,205,760 B2
(45) Date of Patent: Jan. 21, 2025

(54) WIRELESS CHARGING COIL, ELECTRONIC DEVICE, AND ANTENNA

(71) Applicant: HONOR DEVICE CO., LTD., Guangdong (CN)

(72) Inventors: Hua Huang, Shenzhen (CN); Jiaxiang Song, Shenzhen (CN); Xialing Zhang, Shenzhen (CN); Xing Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/041,158

(22) PCT Filed: Aug. 24, 2022

(86) PCT No.: PCT/CN2022/114631
§ 371 (c)(1),
(2) Date: Feb. 9, 2023

(87) PCT Pub. No.: WO2023/098170
PCT Pub. Date: Jun. 8, 2023

(65) Prior Publication Data
US 2024/0282511 A1   Aug. 22, 2024

(51) Int. Cl.
*H01F 27/34* (2006.01)
*H01F 27/28* (2006.01)
*H01F 27/32* (2006.01)
*H02J 50/10* (2016.01)

(52) U.S. Cl.
CPC ......... *H01F 27/34* (2013.01); *H01F 27/2871* (2013.01); *H01F 27/323* (2013.01); *H02J 50/10* (2016.02)

(58) Field of Classification Search
None
See application file for complete search history.

(56) References Cited

U.S. PATENT DOCUMENTS

| 6,798,039 | B1 | 9/2004 | Gillespie et al. |
| 9,362,776 | B2 | 6/2016 | Low et al. |
| 10,277,043 | B2 | 4/2019 | Graham et al. |
| 11,715,976 | B2 | 8/2023 | Chiyo et al. |
| 11,837,877 | B2 | 12/2023 | Pei et al. |

(Continued)

FOREIGN PATENT DOCUMENTS

| CN | 104813420 A | 7/2015 |
| CN | 106898484 A | 6/2017 |

(Continued)

*Primary Examiner* — Jared Fureman
*Assistant Examiner* — Joel Barnett
(74) *Attorney, Agent, or Firm* — Fish & Richardson P.C.

(57) ABSTRACT

This application provides a wireless charging coil, and an electronic device and an antenna that include the wireless charging coil. The wireless charging coil includes a plurality of coil groups that are at a plurality of layers and that are connected in series, and an insulation layer that is disposed between two layers of the plurality of coil groups. The wireless charging coil includes a first area and a second area that is disposed at an outer periphery of the first area. A plurality of coil groups disposed in the second area are arranged at the plurality of layers, and each coil group includes a plurality of coils wound in parallel at one layer.

16 Claims, 15 Drawing Sheets

(56) References Cited

U.S. PATENT DOCUMENTS

| | | |
|---|---|---|
| 2003/0030532 A1 | 2/2003 | Iida |
| 2012/0044034 A1 | 2/2012 | Nazarian et al. |
| 2016/0126009 A1* | 5/2016 | Chien .................... H02J 50/10 |
| | | 336/200 |
| 2017/0179773 A1 | 6/2017 | Kim et al. |
| 2019/0334391 A1* | 10/2019 | Qi .......................... H01F 38/14 |
| 2020/0279686 A1 | 9/2020 | Pei et al. |
| 2020/0411990 A1* | 12/2020 | Nakamura ............. H01Q 21/06 |
| 2021/0012959 A1 | 1/2021 | Pei et al. |
| 2021/0151247 A1 | 5/2021 | Zhu et al. |
| 2021/0151250 A1 | 5/2021 | Zhu et al. |
| 2022/0123593 A1 | 4/2022 | Nawawi et al. |

FOREIGN PATENT DOCUMENTS

| | | |
|---|---|---|
| CN | 107872102 A | 4/2018 |
| CN | 109036803 A | 12/2018 |
| CN | 109087798 A | 12/2018 |
| CN | 109887724 A | 6/2019 |
| CN | 110289156 A | 9/2019 |
| CN | 111092495 A | 5/2020 |
| CN | 108565102 B | 8/2020 |
| CN | 112185659 A | 1/2021 |
| CN | 112735770 A | 4/2021 |
| CN | 113474858 A | 10/2021 |
| CN | 115020077 A | 9/2022 |
| EP | 2421011 A1 | 2/2012 |
| EP | 3761329 A1 | 1/2021 |
| JP | 2003197438 A | 7/2003 |
| JP | 2020141030 A | 9/2020 |
| WO | 2012169719 A1 | 12/2012 |

\* cited by examiner

WIRELESS CHARGING COIL, ELECTRONIC DEVICE, AND ANTENNA

CROSS-REFERENCE TO RELATED APPLICATIONS

This application is a national stage of International Application No. PCT/CN2022/114631, filed on Aug. 24, 2022, which claims priority to Chinese Patent Application No. 202111452805.6, filed on Dec. 1, 2021. The disclosures of both of the aforementioned application are hereby incorporated by reference in their entireties.

TECHNICAL FIELD

Embodiments of this application relate to the field of charging device technologies, and in particular, to a wireless charging coil, an electronic device, and an antenna.

BACKGROUND

A wireless charging coil is usually of a ring structure formed by winding a plurality of coil groups from inside to outside. Each coil group includes a plurality of coils. Current density distribution in some coils on an inner side is not uniform, and a current is mainly concentrated in two coils on two inner sides of each coil group. Consequently, an effective area of a current flowing through these coils is reduced, effective alternating current impedance of the current passing through the coils increases, and charging efficiency is relatively low.

SUMMARY

In view of this, this application provides a wireless charging coil for improving current distribution uniformity.

According to a first aspect, this application provides a wireless charging coil. The wireless charging coil includes a plurality of coil groups that are stacked at a plurality of layers and that are connected in series, and an insulation layer that is disposed between the plurality of layers of the plurality of coil groups. The wireless charging coil includes a first area and a second area that is disposed at an outer periphery of the first area. A plurality of coil groups disposed in the second area are arranged at the plurality of layers, and each coil group includes a plurality of coils wound in parallel at one layer.

In the wireless charging coil, a coil group in which current distribution is not uniform and that is in the first area uses a plurality of coils that are connected in parallel and distributed at the plurality of layers, so that current density in coils in the first area is distributed at the plurality of layers, thereby improving current distribution uniformity.

In a possible implementation, a quantity of coil groups in the first area is M, and a quantity of coil groups in the first area and the second area is N, where M and N meet: N−M≥2 and ≤M≤i+2, and i is an integer obtained after N is divided by 2 and a quotient is rounded down.

Apparently, in the foregoing implementation, by setting a relationship between the quantity M of the coil group in the first area and the total quantity N of the coil groups of the wireless charging coil, a quantity of coil groups in which current distribution is not uniform is equal to or close to M, so that current distribution uniformity of the wireless charging coil is improved.

In a possible implementation, when 3≤N≤4, M>0; and when N>4, M≥i−2.

Apparently, in the foregoing implementation, by setting a relationship between the quantity M of the coil group in the first area and the total quantity N of the coil groups of the wireless charging coil, a quantity of coil groups in which current distribution is not uniform is equal to or close to M, so that current distribution uniformity of the wireless charging coil is improved.

In a possible implementation, a quantity of coils at each layer of the coil group in the first area is t, and two coil groups adjacently connected in series are correspondingly connected by using t coils.

Apparently, in the foregoing implementation, the two coil groups adjacently connected in series in the first area are correspondingly connected by using the t coils, so that a problem of an eddy current loss caused by coil combination is avoided.

In a possible implementation, a quantity of coil groups in the second area is an integer multiple of a quantity of layers at which the plurality of coil groups are distributed.

Apparently, in the foregoing implementation, the quantity of the coil groups in the second area is an integer multiple of the quantity of the layers at which the plurality of coil groups are distributed, to facilitate corresponding stacking of two coil groups at two adjacent layers in the second area.

In a possible implementation, when a difference between quantities of coil groups at two adjacent layers in the second area is greater than or equal to 1, a width sum of a plurality of coils of a coil group at a layer at which a quantity of coil groups is smaller is greater than a width sum of a plurality of coils of a coil group at the other layer.

Apparently, in the foregoing implementation, a width of a coil group at one of layers is increased, and impedance is reduced.

In a possible implementation, a width sum of a plurality of coils of each coil group in the second area is greater than or equal to a width sum of a plurality of coils at a single layer of each coil group in the first area.

Apparently, in the foregoing implementation, the coil group in the first area is distributed at the plurality of layers to conduct a current, and a cross-sectional area sum of a plurality of coils of the coil group is equal to a cross-sectional area sum of coils at the plurality of layers. A width of a coil at a single layer of the coil group in the first area is reduced, so that a cross-sectional area of the coil is reduced, thereby leaving room for widening a coil in the second area. Current distribution in the coil group in the second area is uniform relative to that in the coil group in the first area. A width of a coil of a second coil is increased, and impedance is reduced.

In a possible implementation, in a direction by which the second area faces the first area, a width sum of a plurality of coils of any two coil groups in the first area is decreased or remains unchanged.

Apparently, in the foregoing implementation, a larger distance from the coil group in the first area to a center of the wireless charging coil indicates a higher current distribution uniformity. In the direction by which the second area faces the first area, a width of any two coil groups in the first area is decreased or remains unchanged, and a width of a coil group that is away from the center of the wireless charging coil may be increased, to reduce impedance.

In a possible implementation, an arrangement order of coils of at least one coil group in the first area in a radial direction of the wireless charging coil is changed.

Apparently, in the foregoing implementation, an arrangement order of coils in the coil group in the radial direction is changed, so that a coil close to the center of the wireless charging coil is moved outward and a coil away from the center of the wireless charging coil is moved inward. Current density in coils on two sides in the radial direction is high, and current density in a coil in the middle is low. By changing a position of the coil in the radial direction, current density in the coil is changed, so that current distribution uniformity of the plurality of coils in the coil group is increased.

In a possible implementation, the coils in the first area include a plurality of wire parts, and the wireless charging coil further includes a first connection part and a second connection part. The first connection part passes through the insulation layer, and a plurality of wire parts that are stacked at the plurality of layers and that are in a same arrangement order in the radial direction are connected by using the first connection part and form a wire part group. Two ends of the second connection part are separately connected to two wire part groups that are in different arrangement orders in the radial direction, so that the plurality of wire parts of the coil are connected.

Apparently, in the foregoing implementation, the first connection part connects two coils stacked at two adjacent layers, to simultaneously change arrangement orders in the radial direction; and the second connection part can connect a plurality of wire parts of the coil after the arrangement orders in the radial direction are changed, to implement conduction inside the coil.

In a possible implementation, a plurality of coil arrays of the coil group are uniformly distributed at the plurality of layers, and two crossings enable an arrangement order of a plurality of coils in the radial direction to be reversed; and a plurality of coils that are stacked at the plurality of layers and that are in a same arrangement order in the radial direction form a crossing unit. When a quantity t of coils at a single layer of the coil group meets $3<t\leq7$, in a first crossing, every two crossing units in a plurality of crossing units from two sides to the middle in the radial direction form a crossing group, arrangement orders of two crossing units in each crossing group in the radial direction are interchanged, and when remaining crossing units cannot be equally divided into two groups and a quantity of the remaining crossing units is 2, arrangement orders of two crossing units in the radial direction are interchanged; and when remaining crossing units cannot be equally divided into two groups and a quantity of the remaining crossing units is 3, an arrangement order of a crossing unit in the middle in the radial direction remains unchanged, and arrangement orders of the other two crossing units in the radial direction are interchanged. In a second crossing, arrangement orders of a plurality of crossing units in each crossing group remain unchanged, an arrangement order of a crossing group or crossing unit in the middle remains unchanged, and arrangement orders of two crossing groups on the two sides in the radial direction are interchanged.

Apparently, in the foregoing implementation, by using a set crossing rule, through two crossings of a plurality of coils of the coil group, a sequence arrangement of the plurality of coils in the radial direction is changed to a reverse sequence arrangement, so that coils on the two sides pass through a middle position and are finally interchanged, thereby improving current distribution uniformity.

In a possible implementation, a plurality of coil arrays of the coil group are uniformly distributed at the plurality of layers, and two crossings enable an arrangement order of a plurality of coils in the radial direction to be reversed; and a plurality of coils that are stacked at the plurality of layers and that are in a same arrangement order in the radial direction form a crossing unit. When a quantity t of coils at a single layer of the coil group meets $7<t\leq9$, in a first crossing, every three crossing units in a plurality of crossing units from two sides to the middle in the radial direction form a crossing group; an arrangement order of a crossing unit in the middle of each crossing group in the radial direction remains unchanged, and arrangement orders of two crossing units on the two sides in the radial direction are interchanged; when remaining crossing units cannot be equally divided into two groups and a quantity of the remaining crossing units is 2, arrangement orders of two crossing units in the radial direction are interchanged; and when remaining crossing units cannot be equally divided into two groups and a quantity of the remaining crossing units is 3, an arrangement order of a crossing unit in the middle in the radial direction remains unchanged, and arrangement orders of the other two crossing units in the radial direction are interchanged. In a second crossing, arrangement orders of a plurality of crossing units in each crossing group remain unchanged, an arrangement order of a crossing group or crossing unit in the middle remains unchanged, and arrangement orders of two crossing groups on the two sides in the radial direction are interchanged.

Apparently, in the foregoing implementation, by using a set crossing rule, through two crossings of a plurality of coils of the coil group, a sequence arrangement of the plurality of coils in the radial direction is changed to a reverse sequence arrangement, so that coils on the two sides pass through a middle position and are finally interchanged, thereby improving current distribution uniformity.

In a possible implementation, a quantity of coils of the coil group in the second area is t, a quantity of coils of the coil group in the first area is t, and every two coil groups that are adjacently connected in series and that are of the wireless charging coil are correspondingly connected by using t coils.

Apparently, in the foregoing implementation, in the first area and the second area, and between the two areas, the two coil groups adjacently connected in series are correspondingly connected by using the t coils, so that a problem of an eddy current loss caused by coil combination is avoided.

In a possible implementation, a wire slot is disposed on at least one coil in the second area, so that the coil forms a plurality of sub-coils.

Apparently, in the foregoing implementation, a wire slot may be disposed on a coil that is independently wired, and a plurality of sub-coils are formed, to reduce a width of the sub-coil, so that a problem of an eddy current loss caused by an excessively large width of the coil is avoided.

In a possible implementation, at least two adjacent coils in at least one coil group in the second area are combined into a new coil.

Apparently, in the foregoing implementation, when the quantity of the coil groups in the second area is small and the width of the coil is small, two coils or a plurality of coils in another quantity may be combined into a new coil, to increase a width of the new coil, so that impedance of the new coil is reduced.

According to a second aspect, this application provides an electronic device, where the electronic device includes a wireless charging coil. The wireless charging coil includes a plurality of coil groups that are stacked at a plurality of layers and that are connected in series, and an insulation layer that is disposed between the plurality of layers of the plurality of coil groups. The wireless charging coil includes a first area and a second area that is disposed at an outer periphery of the first area. A plurality of coil groups disposed in the second area are arranged at the plurality of layers, and each coil group includes a plurality of coils wound in parallel at one layer.

In the electronic device, in the wireless charging coil, a coil group in which current distribution is not uniform and that is in the first area uses a plurality of coils that are connected in parallel and distributed at the plurality of layers, so that current density in coils in the first area is distributed at the plurality of layers, thereby improving current distribution uniformity, and further improving charging efficiency of the electronic device.

According to a third aspect, this application provides an antenna, where the antenna is of a structure of a wireless charging coil. The wireless charging coil includes a plurality of coil groups that are stacked at a plurality of layers and that are connected in series, and an insulation layer that is disposed between the plurality of layers of the plurality of coil groups. The wireless charging coil includes a first area and a second area that is disposed at an outer periphery of the first area. A plurality of coil groups disposed in the second area are arranged at the plurality of layers, and each coil group includes a plurality of coils wound in parallel at one layer.

In the antenna, in the wireless charging coil, a coil group in which current distribution is not uniform and that is in the first area uses a plurality of coils that are connected in parallel and distributed at the plurality of layers, so that current density in coils in the first area is distributed at the plurality of layers, thereby improving current distribution uniformity, and further improving charging efficiency of the antenna.

BRIEF DESCRIPTION OF DRAWINGS

FIG. 13 is a schematic diagram of a crossing part of a wireless charging coil corresponding to FIG. 12a;

DESCRIPTION OF REFERENCE SIGNS OF MAIN COMPONENTS

Electronic device: 200a, 200b; Wireless charging coil: 100, 100a, 100b, 100c, 100d, 300, 300a, and 300b; First layer: 101; Second layer: 102; First area: 103; Second area: 104; First end: 105; Second end: 106; Coil group: 10, 10a, 10, 10c, 10d, 10e, 10f, 10g, 10h, 10i, 301, 301a, 301b; Coil: 111, 111a, 111b, 111c, 111d, 111e, 111f, 11g, 111h, 111j, 3011, 3011a, 3011b; Wire slot: 107; Sub-coil: 1111; First coil group: 11, 11a, 11b; Second coil group: 12, 12a; Third coil group: 13; Fourth coil group: 14; Fifth coil group: 15; Sixth coil group: 16; Seventh coil group: 17; Wire part: 1a, 2a, 3a, 1b, 2b, 3b, 4b, 1c, 2c, 3c, 4c, 1d, 2d, 3d, 4d; Insulation layer: 20; First connection part: 30; and Second connection part: 40.

DESCRIPTION OF EMBODIMENTS

To further describe technical means and effects that are used by this application to achieve a predetermined application objective, the following describes embodiments with reference to accompanying drawings and implementations. Apparently, the described embodiments are only some rather than all of the embodiments of this application.

Unless otherwise defined, all technical terms and scientific terms used in this specification have the same meaning as those commonly understood by those skilled in the art of this application. The terms used in the specification of this application herein are only used to describe particular embodiments, but not intended to limit this application.

The following describes in detail some implementations of this application with reference to the accompanying drawings. The following embodiments and features in the embodiments may be combined, provided that no conflict occurs.

An embodiment of this application provides an electronic device.

Figure 1:
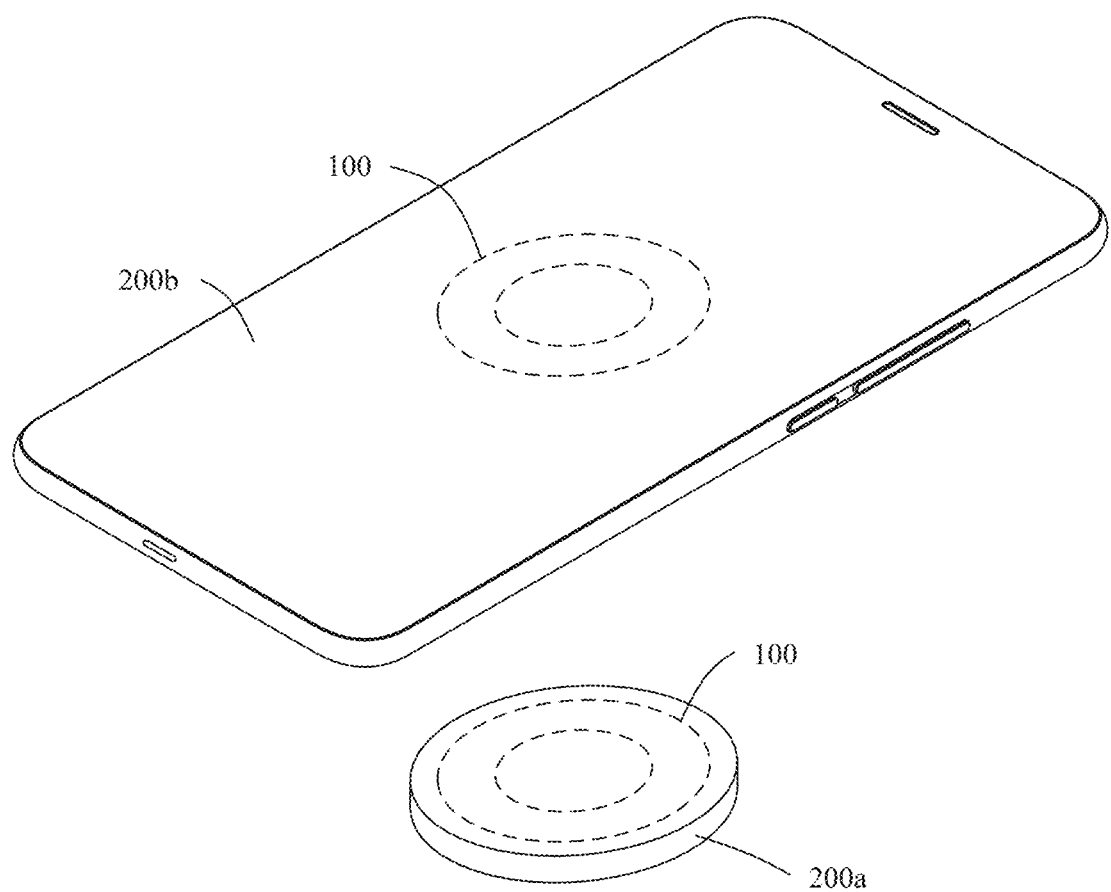
FIG. 1 is a schematic diagram of two electronic devices according to an embodiment of this application.

Two electronic devices shown in FIG. 1 are respectively an electronic device 200a and an electronic device 200b. The electronic device 200a is a wireless charger for charging, and a wireless charging coil 100 is disposed in the electronic device 200a. The electronic device 200b is a mobile phone. A wireless charging coil 100 is disposed in the electronic device 200b. The wireless charging coil of the electronic device 200a conducts an alternating current, and generates an alternating electromagnetic field. The wireless charging coil 100 of the electronic device 200 generates an induced voltage in the alternating magnetic field to implement energy transfer, and the electronic device 200a implements wireless charging for the electronic device 200.

It may be understood that, in another embodiment, the electronic device may further be a tablet personal computer (Tablet Personal Computer), a laptop computer (Laptop Computer), a personal digital assistant (Personal Digital Assistant, PDA), a mobile internet device (Mobile Internet Device, MID), a wearable device (Wearable Device), or the like.

Figure 2:
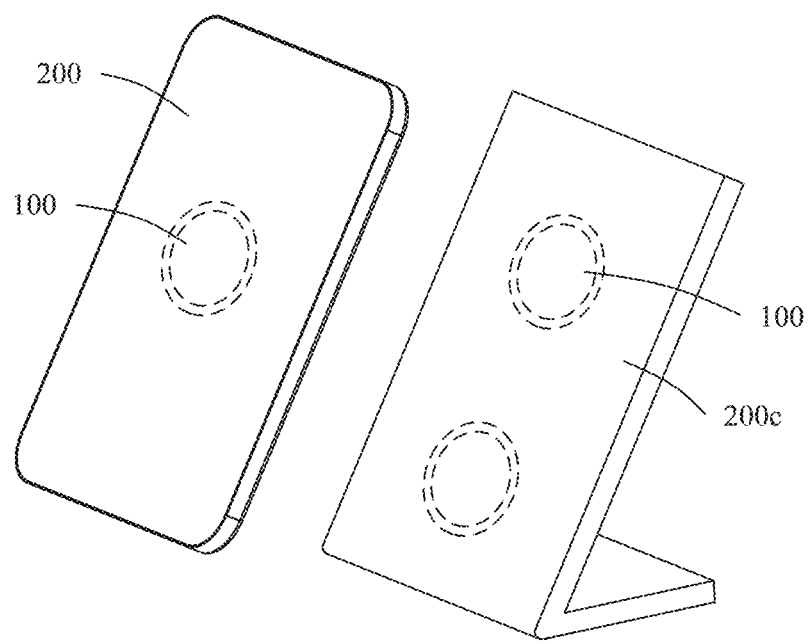
FIG. 2 is a schematic diagram of a structure of an electronic device according to another embodiment of this application.

A quantity of coils in the electronic device is not limited to one. For example, as shown in FIG. 2, in another embodiment, an electronic device 200c is a vertical wireless charger, and an electronic device 200 may stand with a tilt on the electronic device 200c. Two wireless charging coils 100 are disposed in the electronic device 200c, the two wireless charging coils 100 separately conduct alternating currents, and can both generate induced voltages in a wireless charging coil 100 in the electronic device 200, so that wireless charging for the electronic device 200 is implemented.

Figure 3:
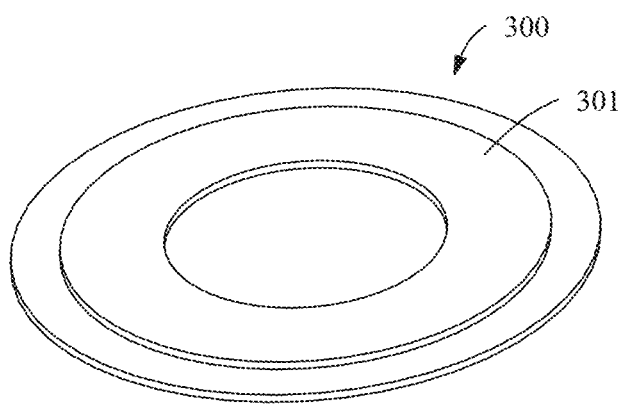
FIG. 3 is a schematic diagram of a wireless charging coil in the conventional technology.
Figure 4:
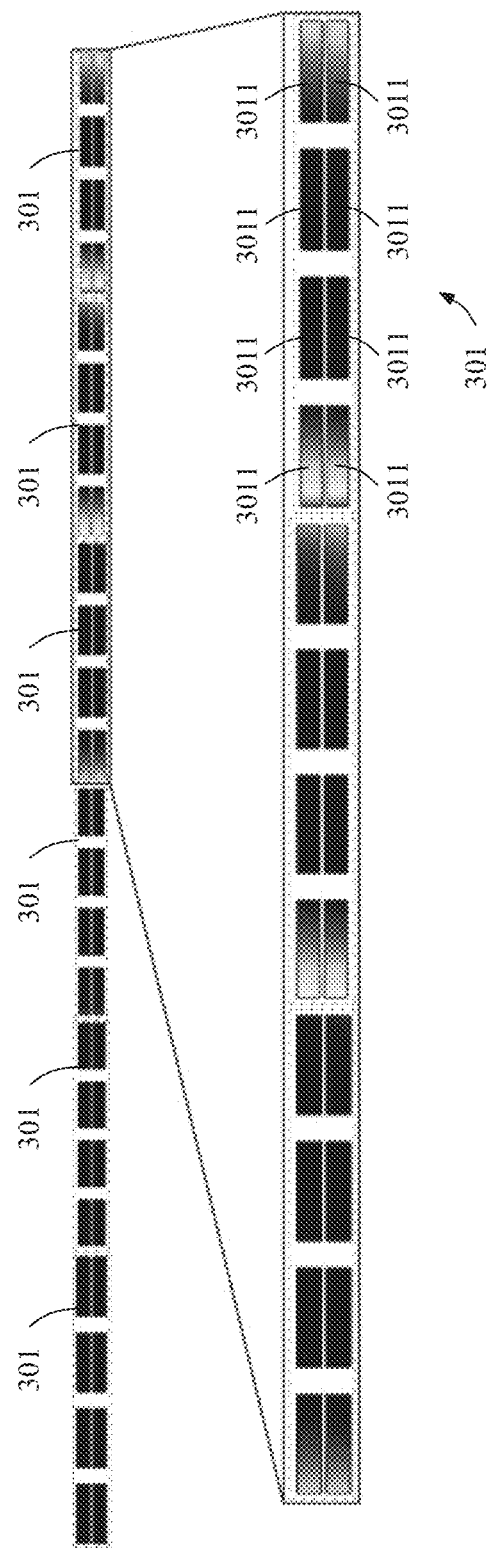
FIG. 4 is a cross-sectional schematic view of a single side of the wireless charging coil shown in FIG. 3 in a radial direction.

Referring to FIG. 3 and FIG. 4, a wireless charging coil 300 in the conventional technology includes six coil groups 301. Each coil group 301 includes eight coils 3011. Eight coils 3011 are wound in parallel at two layers, so that there are four coils 3011 arranged at each layer. As shown in a partially enlarged schematic diagram in FIG. 4, current distribution in three coil groups 301 close to a center of the wireless charging coil 300 is not uniform. A current is mainly concentrated in areas of two sides of each coil group 301, leading to an excessively low current in a middle area. Consequently, an effective area of a current flowing through coils 3011 in these coil groups 301 is reduced, effective alternating current impedance of the current passing through the coils 3011 is increased, and charging efficiency is relatively low.

Figure 5:
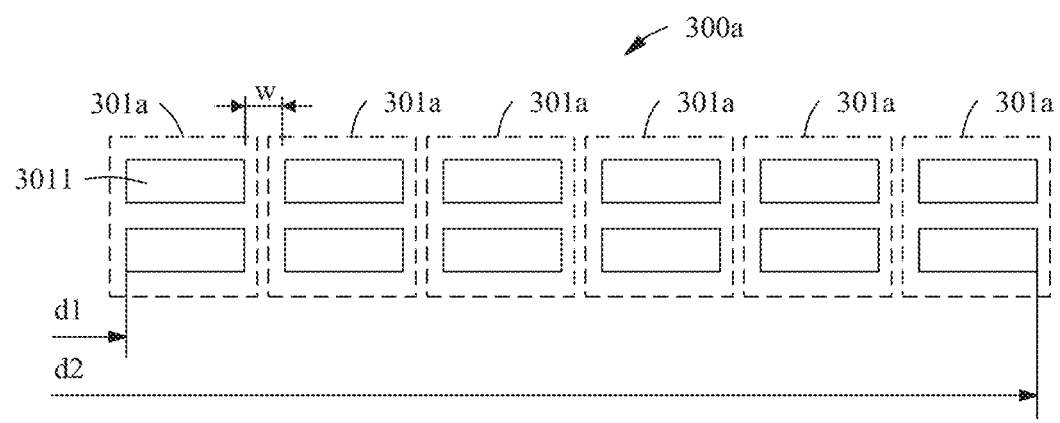
FIG. 5 and FIG. 6 are separately cross-sectional schematic views of single sides of two different wireless charging coils in the conventional technology.

Referring to FIG. 5, another wireless charging coil 300a in the conventional technology includes six coil groups 301a. Two coils 3011a of each coil group 301a are connected in parallel and wound at two layers, and the six coil groups are connected in series. An inner diameter d1 of the wireless charging coil 300a is 20 mm, and an outer diameter d2 of the wireless charging coil 300a is 40 mm. There are five spacings between the six coil groups. A spacing width w in a radial direction is 0.1 mm. A width sum of a plurality of coils 3011a in the wireless charging coil 300a in the radial direction is (40−20−5×0.1)×2=39 mm.

Figure 6:
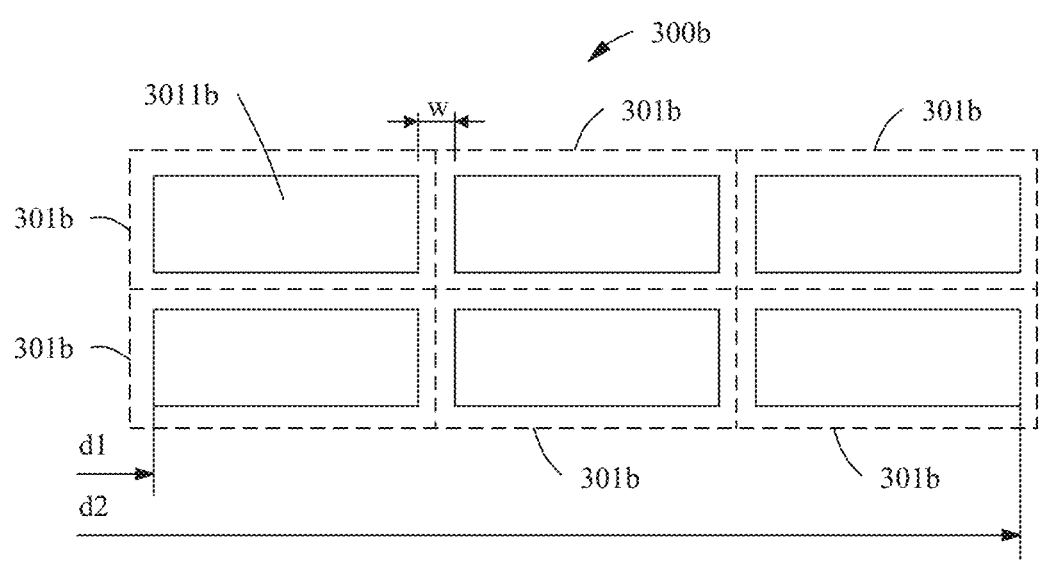

Referring to FIG. 6, another wireless charging coil 300b in the conventional technology includes six coil groups 301b. Coils 3011b of each coil group 301b are distributed at a same layer. The six coil groups 301b are distributed at two layers, and every two coil groups 301b are correspondingly arranged at the two layers. The six coil groups 301b are distributed at the two layers, and there are two spacings in the wireless charging coil 300b in a radial direction. A width sum of a plurality of coils 3011b in the wireless charging coil 300a in the radial direction is (40−20−2×0.1)×2=39.6 mm.

A quantity of coils 3011b of each coil group 301b in the wireless charging coil 300b is the same as a quantity of coils 3011a of each coil group 301a in the wireless charging coil 300a, and the quantity may be two or another number.

Alternating current impedance RAC is greater than or equal to direct current impedance RDC. A lower limit of the alternating current impedance is equal to the direct current impedance. Reducing the alternating current impedance to the minimum can only reach a level of the direct current impedance RDC. Therefore, to reduce the alternating current impedance RAC, reducing the direct current impedance RDC is also a key measure.

Compared with a solution shown in FIG. 6 in which each coil group 301a is internally connected in parallel at one layer, in a solution shown in FIG. 5 in which each coil group 301a is internally connected in parallel at two layers, a smaller width sum of the coils 3011a in the radial direction indicates a smaller total volume of the coil 3011a and higher direct current impedance RDC.

As shown in FIG. 6, each coil group 301b is internally connected in parallel at one layer, and a plurality of coil groups 301b are connected in series and distributed at two layers. A larger width sum of the coils 3011b in the radial direction indicates a larger total volume of the coil 3011b and lower direct current impedance RDC. However, current distribution in several coil groups 301b close to a center of the wireless charging coil 300b is not uniform. Although direct current impedance RDC is reduced, alternating current impedance is not reduced.

Figure 7:
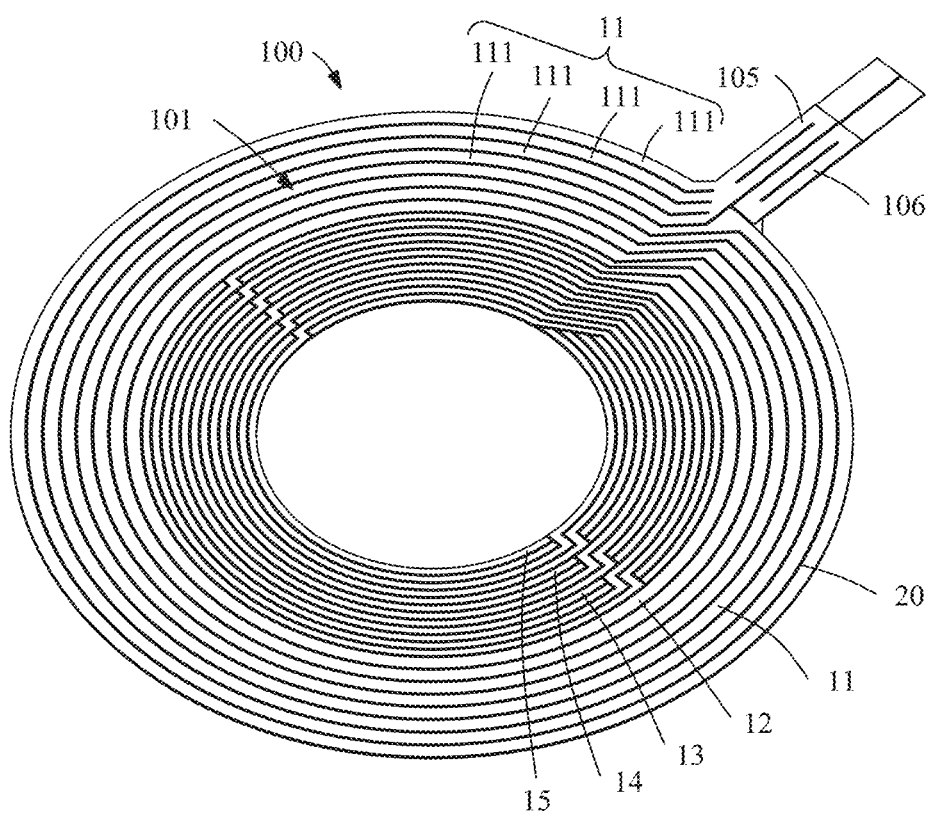
FIG. 7 is a schematic diagram of a wireless charging coil in the electronic device shown in FIG. 1.
Figure 8:
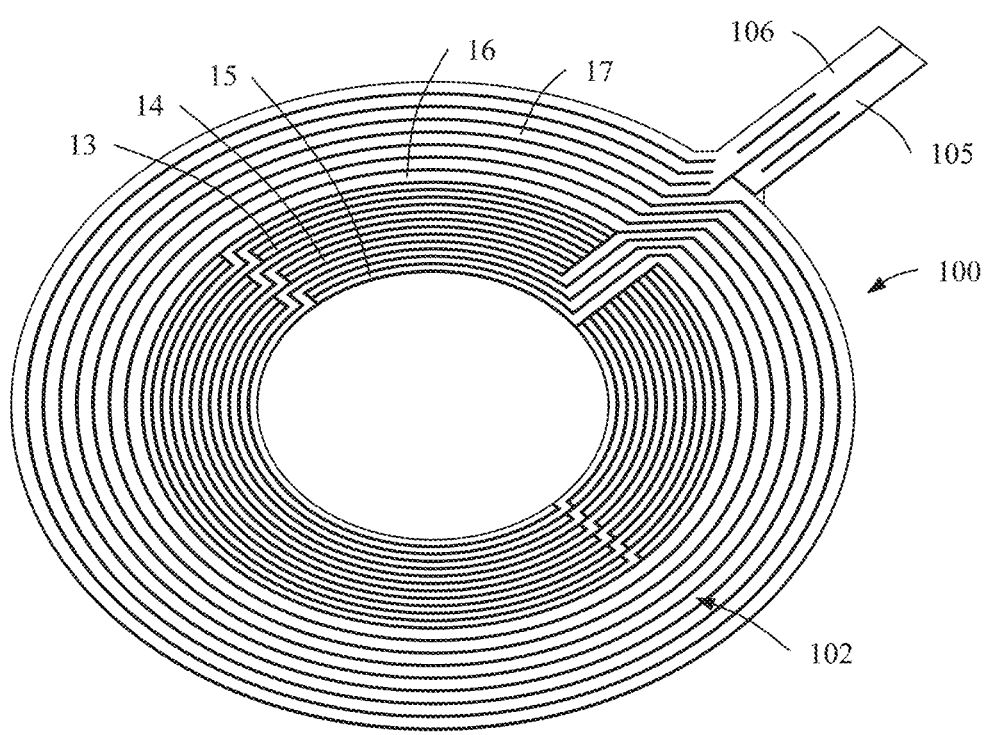
FIG. 8 is a schematic diagram of the wireless charging coil shown in FIG. 7 from another perspective.
Figure 9:
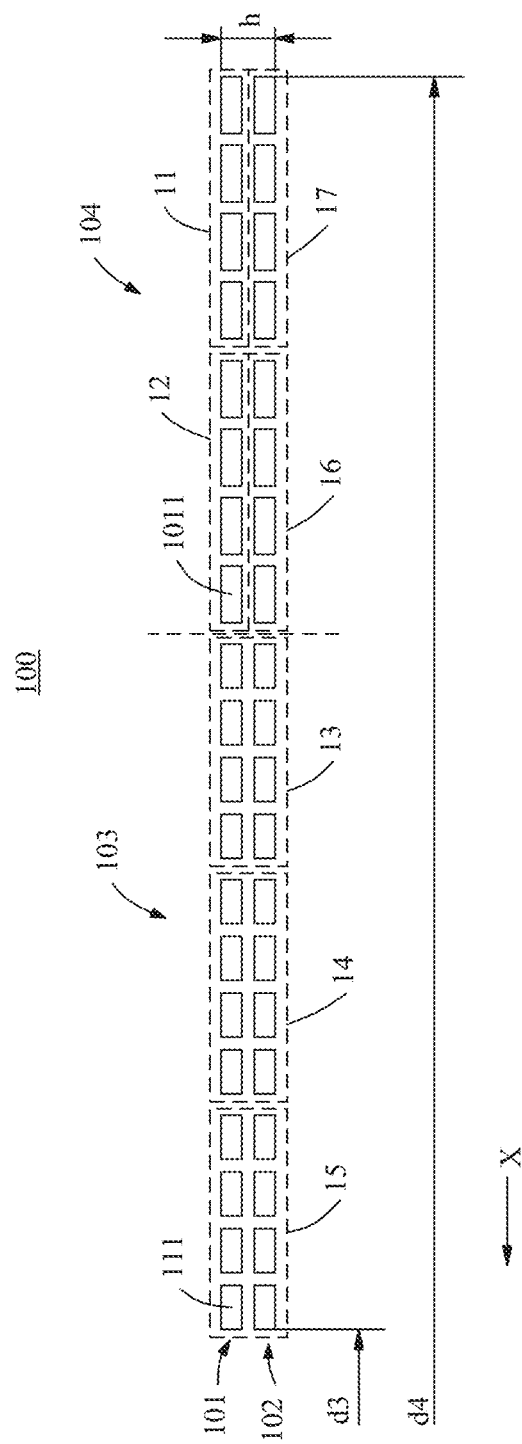
FIG. 9 is a cross-sectional schematic view of a single side of the wireless charging coil shown in FIG. 7 in a radial direction.

Referring to FIG. 7, FIG. 8, and FIG. 9, the wireless charging coil 100 includes a plurality of coil groups 10 and an insulation layer 20. The plurality of coil groups 10 are stacked at two layers (a first layer 101 and a second layer 102), and are disposed on two opposite sides of the insulation layer 20. The plurality of coil groups 10 are sequentially connected in series. A plurality of coils 111 in each coil group 10 are connected in parallel. The wireless charging coil 100 includes a first area 103 and a second area 104. The second area 104 is disposed at an outer periphery of the first area 103. Each coil group 10 disposed in the second area 104 includes t coils 111 wound in parallel at a same layer and connected in parallel. Each coil group 10 disposed in the first area 103 includes 2t coils 111 wound in parallel at the two layers, t coils 111 are wound at the first layer 101, and the other t coils 111 are wound at the second layer 102. t coils 111 of two coil groups 10 adjacently connected in series are correspondingly connected.

The wireless charging coil 100 is an FPC coil, and the coil 111 is formed by etching a conducting layer (for example, a copper layer, an aluminum layer, a nickel layer, a gold layer, a silver layer, or an alloy layer), but a manner is not limited thereto. For example, in another embodiment, the wireless charging coil 100 may also be formed by winding a conducting wire.

The wireless charging coil 100 includes a first end 105 and a second end 106. A current is input from the first end 105 and output from the second end 106. The wireless charging coil 100 is formed by continuously winding t coils 111 from the first end 105 to connect the second end 106, and is distributed at the two layers. A conducting layer with t spacings are formed by inwardly winding along a helix from the first end 105, and one coil group 10 is formed at each circle. In an embodiment, t is 4, four coil groups 10 are disposed in the second area 104, and three coil groups 10 are disposed in the first area 103. This is not limited thereto.

It may be understood that, in another embodiment, a current may also be input from the second end 106 and output from the first end 105.

Two coil groups 10 that are in the second area 104 and that are adjacent to the first area 103 are separately connected in series with two coil groups 10 that are in the first area 103 and that are on two sides in a radial direction.

The plurality of coil groups 10 include a first coil group 11, a second coil group 12, a third coil group 13, a fourth coil group 14, a fifth coil group 15, a sixth coil group 16, and a seventh coil group 17.

FIG. 7 is a schematic diagram of winding of a wireless charging coil 100 at a first layer 101. The first coil group 11 and the second coil group 12 are sequentially wound in the radial direction in the second area 104 of the first layer 101, and the first coil group 11 is connected to the first end 105. The third coil group 13, the fourth coil group 14, and the fifth coil group 15 are sequentially wound in the radial direction in the first area 103, and are separately arranged at the first layer 101 and the second layer 102. t coils 111 that are of every three coil groups in the first area 103 and that are separately disposed at the first layer 101 and at the second layer 102 are sequentially connected, so that the three coil groups in the first area 103 are connected in series. t coils 111 that are of the third coil group 13 and that are disposed at the first layer 101 are correspondingly connected to t coils 11 of the second coil group 12, so that the third coil group 13 and the second coil group 12 are connected in series. FIG. 8 is a schematic diagram of winding of a wireless charging coil 100 at a second layer 102. The sixth coil group 16 and the seventh coil group 17 are sequentially wound in the radial direction in the second area 104 of the second layer 102. The seventh coil group 17 is connected to the second end 106. t coils 111 that are of the fifth coil group 15 and that are disposed at the second layer 102 are correspondingly connected to t coils 111 of the sixth coil group 16, so that the fifth coil group 15 and the sixth coil group 16 are connected in series.

The coil group 10 in the first area 103 uses 2t coils 111 that are connected in parallel and distributed at the two layers, so that current density in the coils 111 in the first area 103 is distributed at the two layers, thereby improving current distribution uniformity.

Each coil 111 of the wireless charging coil 100 is independently wired, and a quantity of coils 111 that are of a plurality of coil groups 10 and that are at a single layer is the same, and the coils 111 are sequentially connected, so that a problem that when a quantity of coils 111 of different coil groups 10 is different, two coils 111 need to be combined and connected to an adjacent coil 111, and an eddy current loss is caused is avoided.

A plurality of coil groups 10 in the second area 104 are connected in series, and it is unnecessary to make a conductive structure between an upper layer and a lower layer, so that a winding process of the wireless charging coil 100 is simplified. In the wireless charging coil 100 provided in this embodiment of this application, each coil group 10 that is in the first area 103 close to the center is connected in parallel and wound at the two layers, and each coil group 10 in the second area 104 is connected in parallel and wound at a single layer, so that the obtained wireless charging coil 100 has lower alternating current impedance RAC than that of the wireless charging coil 300a shown in FIG. 5 and that of the wireless charging coil 300b shown in FIG. 6.

Each coil 111 of the wireless charging coil 100 is independently wired, and impedance is reduced. As shown in FIG. 9, a thickness h of the wireless charging coil 100 is 0.17 mm, an inner diameter d3 is 20 mm, an outer diameter d4 is 46 mm, a quantity of coil groups 10 is 7, and four coils 111 are distributed at each layer of the coil group 10. A difference between a first wireless charging coil (not shown in the figure) and the wireless charging coil 100 shown in FIG. 9 lies in that all coils in two adjacent coil groups in a first area are combined and then connected. A difference between a second wireless charging coil (not shown in the figure) and the wireless charging coil 10 shown in FIG. 9 lies in that every two coils in two adjacent coil groups in a first area are combined and then connected. Table 1 is a parameter table of the wireless charging coil 100 shown in FIG. 9, the first wireless charging coil, and the second wireless charging coil when a current is conducted and an inductance value is 2 µH. Q is an inductance quality factor, which is a ratio of a presented inductive resistance to an equivalent loss resistance of the wireless charging coil when the wireless charging coil operates at an alternating voltage of a frequency. A higher Q value indicates a lower loss of the wireless charging coil and higher charging efficiency.

TABLE 1

| Component name | RAC/mΩ | RDC/mΩ | Q |
|---|---|---|---|
| Wireless charging coil 100 | 79.178 | 75.612 | 15.262 |
| First wireless charging coil | 93.43 | 78.64 | 13.478 |
| Second wireless charging coil | 85.8 | 77.6 | 14.66 |

A difference between the wireless charging coil 100 shown in FIG. 9, the first wireless charging coil, and the second wireless charging coil lies only in different connection manners of two adjacent coil groups. It may be learned from data in the foregoing table that an order of wireless charging coils that are sorted in descending order of impedance is: the first wireless charging coil shown in FIG. 9, the second wireless charging coil, and the wireless charging coil 100. A plurality of coils 111 of the wireless charging coil 100 shown in FIG. 9 are independently wired, and impedance of the wireless charging coil 100 is approximately 15% lower than that of the first wireless charging coil.

Referring to FIG. 9, a quantity of the coil groups 10 in the first area 103 is three, a quantity of the coil groups 10 in the second area 104 is four, and the coil groups 10 in the second area 104 are distributed at the two layers, but this is not limited thereto. The quantity of the coil group 10 in the first area 103 is set based on a quantity of coil groups in which current distribution is not uniform when a winding manner (such as that of the wireless charging coil 300 shown in FIG. 3, the wireless charging coil 300a shown in FIG. 5, and the wireless charging coil 300b shown in FIG. 6) of the wireless charging coil 100 in the radial direction is consistent. The quantity of the coil group in which current distribution is not uniform can be obtained based on experience or simulation.

When the quantity of the coil groups 10 in the second area 104 is small and a width of a coil 111 is large, a wire slot may be disposed on the coil 111, the wire slot separates the coil to form a plurality of sub-coils, to reduce a width of a sub-coil that conducts a current, so that a problem of an eddy current loss caused by an excessively large width of the coil 111 is avoided. Wire slots may be disposed on all coils 111 in the second area 104, or wire slots may be disposed on only some of the coils 111. Quantities of wire slots disposed on different coils 111 may be the same or different.

Figure 10A:
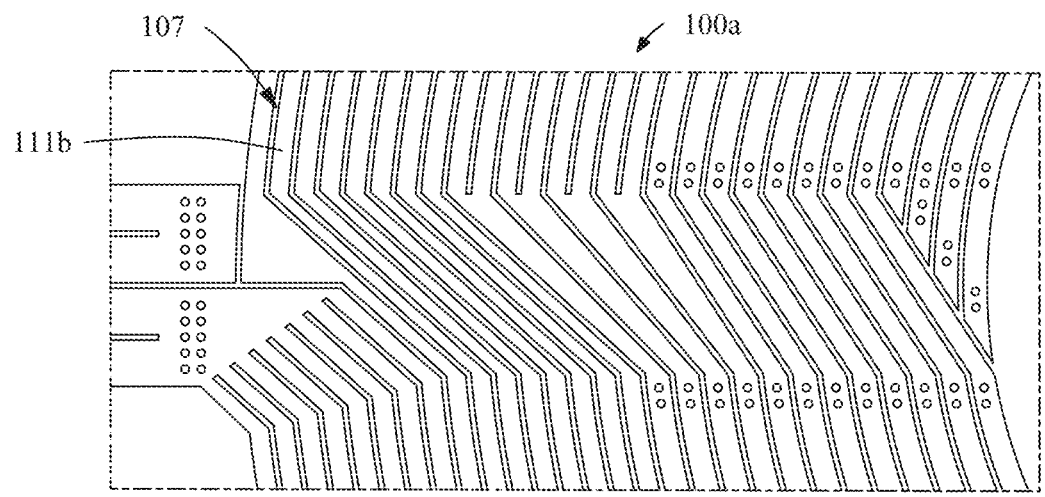
FIG. 10a to FIG. 10c are respectively schematic diagrams of disposing wire slots on different quantities of coils in a second area of the wireless charging coil shown in FIG. 4.
Figure 10B:
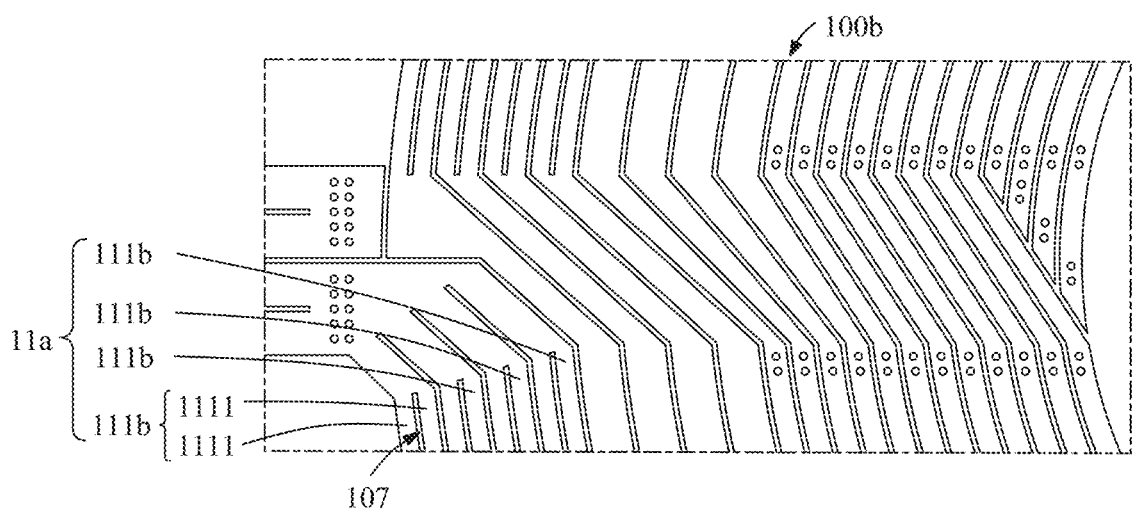
Figure 10C:
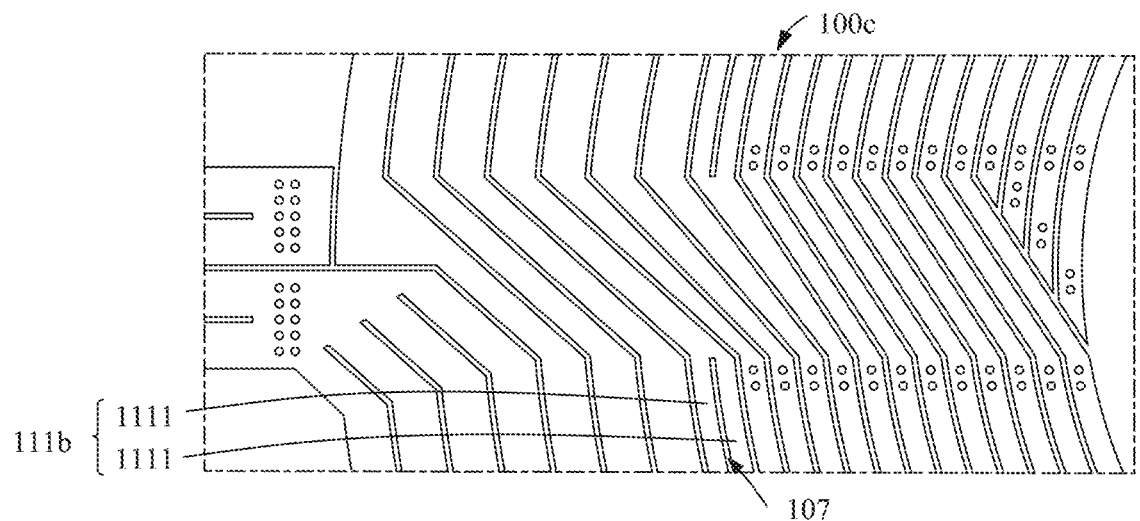

For example, as shown in FIG. 10a, in the second area 104, a difference between a wireless charging coil 100a and the wireless charging coil 100 lies in that a wire slot 107 is disposed on each coil 111b of the wireless charging coil 100a, and two sub-coils 1111 are formed. For another example, as shown in FIG. 10b, a difference between a wireless charging coil 100b and the wireless charging coil 100 lies in that the wire slot 107 is only disposed on each coil 111b of a first coil group 11a that is disposed on an outermost side and that is in the wireless charging coil 100b, and two sub-coils 1111 are formed. For another example, as shown in FIG. 10c, a difference between a wireless charging coil 100c and the wireless charging coil 100 lies in that the wire slot 107 is only disposed on a coil 111b that is adjacent to a first area and that is in the wireless charging coil 100c, and two sub-coils 1111 are formed.

It may be understood that, in another embodiment, a quantity of coils 111 in the coil group 10 in the second area 104 may also be different from a quantity of coils 111 at a single layer in the coil group 10 in the first area 103.

Figure 11A:
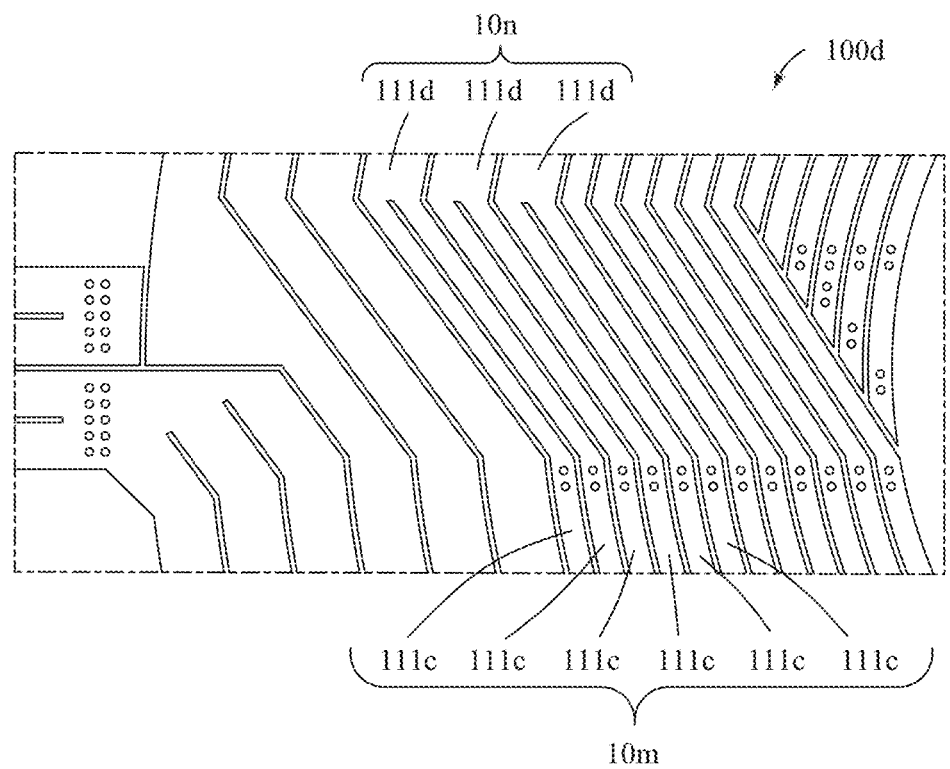
FIG. 11a to FIG. 11b are respectively schematic diagrams in which quantities of coils in a coil group in a second area and a first area are different according to another embodiment of a wireless charging coil.
Figure 11B:
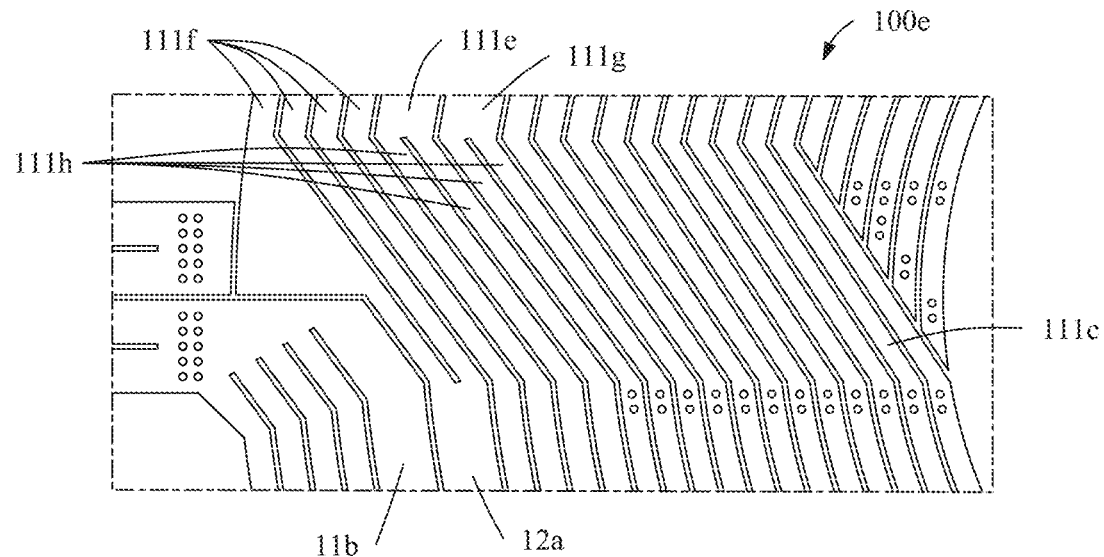

When the quantity of the coil groups 10 in the second area 104 is small and the width of the coil 111 is small, two coils 111 or a plurality of coils 111 in another quantity may be combined into a new coil, to increase a width of the new coil, so that impedance of the new coil is reduced. For example, as shown in FIG. 11a, a difference between a wireless charging coil 100d and the wireless charging coil 100 lies in that a quantity of coils 111c at each layer of each coil group 10m in the first area 103 is six, and a quantity of coils 111d of each coil group 10n in the second area 104 is three. Every two coils 111c adjacent to the first area 103 and the second area 104 are combined and then connected to one coil 111d. For another example, as shown in FIG. 11b, a difference between a wireless charging coil 100e and the wireless charging coil 100d lies in that a quantity of coils of a first coil group 11b and that of a second coil group 12a are both 5, and both coil groups are at the first layer 101 in the second area 104. A width of a coil 111e that is adjacent to the second coil group 12a and that is of the first coil group 11b is greater than a width of another coil 111f of the first coil group 11b. A width of a coil 111g that is adjacent to the first coil group 11b and that is of the second coil group 12a is greater than a width of another coil 111h of the second coil group 12a. The coil 111e is connected to two coils 111h of the second coil group 12a. The coil 111g is connected to two coils 111h.

A quantity of coil groups 10 in the first area 103 is M, and a total quantity of coil groups 10 in the first area 103 and the second area 104 is N, where i is set to be an integer obtained after N is divided by 2 and rounded down.

M and N meet the following requirements:

$$N - M \geq 2 \text{ and } M \leq i + 2.$$

When 3≤N≤4, M>0; and when N>4, M≥i−2.

By setting a relationship between the quantity M of the coil group 10 in the first area 103 and the total quantity N of the coil groups 10 of the wireless charging coil 100, a quantity of coil groups 10 in which current distribution is not uniform is equal to or close to M, so that current distribution uniformity of the wireless charging coil 100 is improved.

When N−M≥2, it is ensured that there are coils 111 disposed on the two layers of the second area 104 of the wireless charging coil 100, so that a current is distributed at the two layers.

For example, when N=3, i=1, and 0<M≤3, N−M≥2 needs to be met, so that M=1 is finally obtained.

For another example, when N=4, i=2, and 0<M≤4, N−M≥2 needs to be met, so that 0<M≤2 is finally obtained.

For another example, when N=7, i=3, and 1≤M≤5, N−M≥2 is met.

N−M is set to be an even number, to facilitate corresponding stacking of two coil groups 10 at the two layers in the second area 104.

It may be understood that, in another embodiment, N−M may also be an odd number. When the quantity of the coil groups 10 in the second area 104 is an odd number, a difference between quantities of coil groups 10 at the two layers is 1, and a width of a coil group 10 at a layer at which a quantity of coil groups 10 is smaller is greater than a width of a coil group 10 at the other layer. For example, a quantity of coil groups 10 at the first layer 101 in the second area 104 is three, and a quantity of coil groups 10 at the second layer 102 is two. A width of the coil groups 10 at the second layer 102 is greater than a width of the coil groups 10 at the first layer 101, so that impedance is reduced.

It may be understood that, in another embodiment, a quantity of coil groups 10 is not limited to an integer. For example, in another embodiment, the quantity of the coil groups 10 in the second area 104 may also be 4.5. In comparison with the wireless charging coil 100 shown in FIG. 7, the two layers each have 0.25 circles of additional conducting layers.

Table 2 lists values of M and N−M when N is 3 to 16.

TABLE 2

| N | M | N − M |
|---|---|-------|
| 3 | 1 | 2 |
| 4 | 2 | 2 |
| 5 | 3 | 2 |
| 6 | 2 | 4 |
| 7 | 3 | 4 |
| 8 | 4 | 4 |
| 9 | 5 | 4 |
| 10 | 4 | 6 |
| 11 | 5 | 6 |
| 12 | 6 | 6 |
| 13 | 7 | 6 |
| 14 | 6 | 8 |
| 15 | 7 | 8 |
| 16 | 8 | 8 |

The coil group 10 in the first area 103 is distributed at the two layers to conduct a current, and a cross-sectional area sum of a plurality of coils 111 of the coil group 10 is equal to a cross-sectional area sum of coils 111 at the two layers. A width of a coil 111 of the coil group 10 in the first area 103 is reduced, so that a cross-sectional area of the coil 111 is reduced, thereby leaving room for widening a coil 111 in the second area 104. A current in the coil group 10 in the second area 104 is uniformly distributed relative to that in the coil group 10 in the first area. A width of the coil 111 of a second coil 111 is increased, and impedance is reduced.

A width of each coil group 10 in the second area 104 in the wireless charging coil 100 is greater than or equal to a width of each coil group 10 in the first area 103.

For clarity of description, a direction X is defined as a direction by which the second area 104 faces the first area 103.

A larger distance from the coil group 10 in the first area 103 to the center of the wireless charging coil 100 indicates a greater current distribution uniformity. In the direction X, a width of any two coil groups 10 in the first area 103 is reduced or maintained, and a width of a coil group 10 that is away from the center of the wireless charging coil 100 may be increased, to reduce impedance.

An arrangement order of coils 111 of at least one coil group 10 in the first area 103 in the radial direction of the wireless charging coil 100 is changed, to change an arrangement order of coils 11 in the coil group 10 in the radial direction, so that a coil 111 close to the center of the wireless charging coil 100 is moved outward and a coil 111 away from the center of the wireless charging coil 100 is moved inward. Current density in coils 111 on two sides in the radial direction is high, and current density in a coil 111 in the middle is low. By changing a position of the coil 111 in the radial direction, current density in the coil 111 is changed, so that current distribution uniformity of the plurality of coils 111 in the coil group 10 is increased.

The plurality of coils 111 of the coil group 10 are uniformly distributed at the two layers, and an arrangement order of the plurality of coils 11 in the radial direction is to be reversed in a crossing manner. Two coils 111 stacked at the two layers form a crossing unit.

Figure 12A:
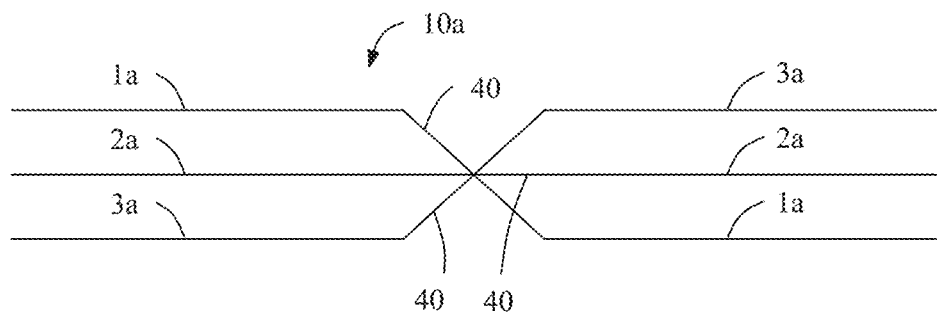
FIG. 12a to FIG. 12g are respectively schematic diagrams of crossings of a coil group that is formed by winding different quantities of coils and that is of a wireless charging coil provided in this application.
Figure 13:
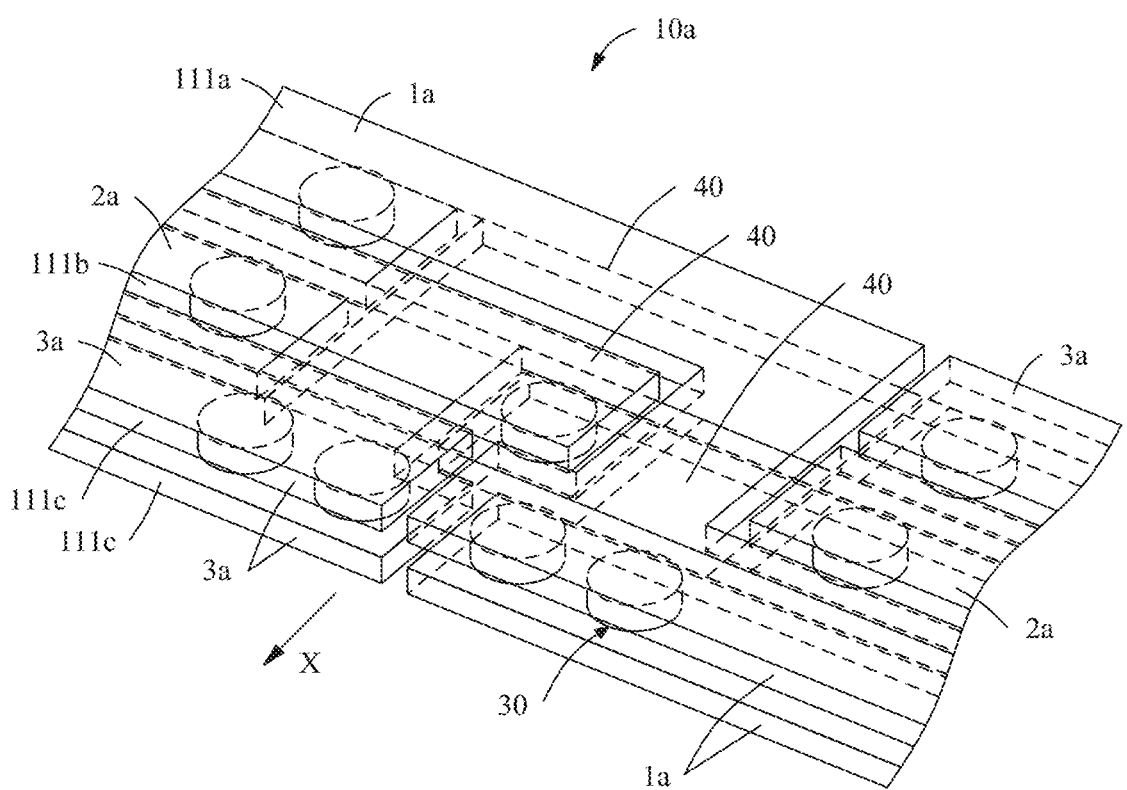

Referring to FIG. 12a and FIG. 13, in another embodiment, a coil group 10a in a first area includes six coils: two coils 111a, two coils 111b, and two coils 111c. Every three coils 111 are distributed at a same layer. Every two coils stacked at the two layers form a crossing unit. Orders of two crossing units on the two sides in the radial direction are interchanged, and an arrangement order of a crossing unit in the middle remains unchanged.

In the direction X, an arrangement order of two layers of the two coils 111a is 1, and each coil 111a includes two wire parts 1a; an arrangement order of two layers of the two coils 111b is 2, and each coil 111b includes two wire parts 2a; and an arrangement order of two layers of the two coils 111c is 3, and each coil 111c includes two wire parts 3a.

The wireless charging coil further includes a plurality of first connection parts 30. The first connection part 30 can pass through the insulation layer. Two wire parts 1a are connected to the first connection part 30 to form a wire part group. Two wire parts 2a are connected to the first connection part 30 to form a wire part group. Two wire parts 3a are connected to the first connection part 30 to form a wire part group.

The wireless charging coil further includes a plurality of second connection parts 40. Two ends of the second connection part 40 are separately connected to two wire part groups that are in different arrangement orders in the radial direction, so that the two wire parts 1a of the coil 111a are connected. Two ends of the second connection part 40 are separately connected to two wire part groups that are in different arrangement orders in the radial direction, so that the two wire parts 2a of the coil 111b are connected. Two ends of the second connection part 40 are separately connected to two wire part groups that are in different arrangement orders in the radial direction, so that the two wire parts 3a of the coil 111c are connected.

The first connection part 30 connects two coils stacked at the two layers, to simultaneously change arrangement orders in the radial direction. The second connection part 40 can connect a plurality of wire parts of the coil after the arrangement orders in the radial direction are changed, to implement conduction inside the coil.

Figure 12B:
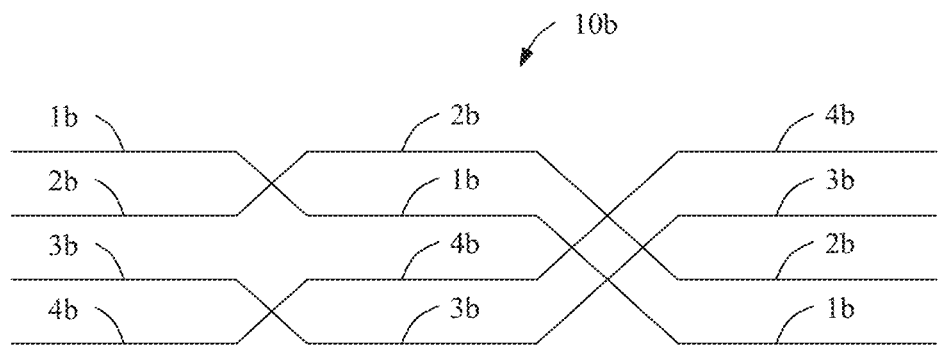
Figure 12C:
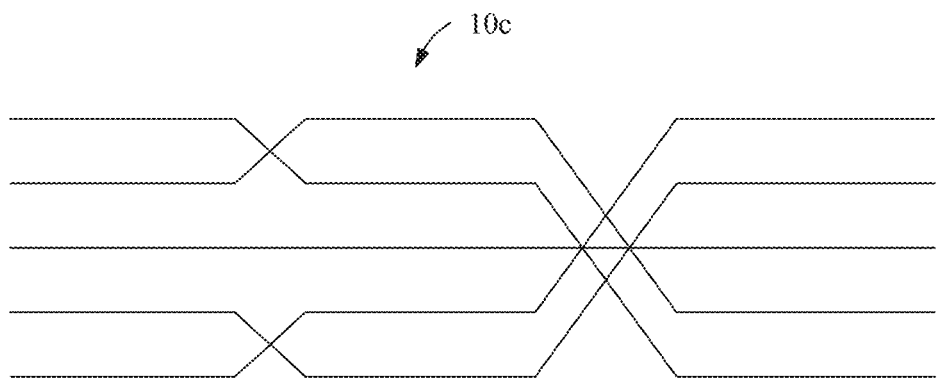
Figure 12D:
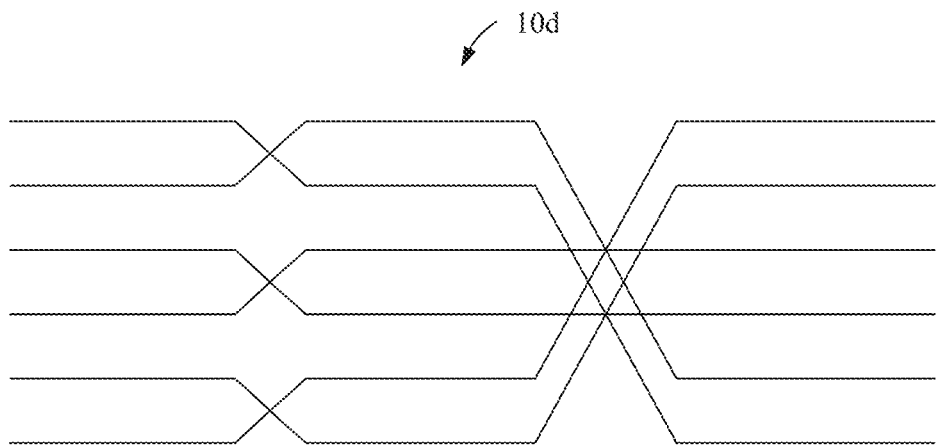

Referring to FIG. 12b to FIG. 12d, when a quantity t of coils at a single layer of the coil group meets 3<t≤7, two crossings exist in a coil group in the first area, so that an arrangement order of a plurality of coils in the radial direction is reversed. Two coils stacked at the two layers form a crossing unit. A principle of the two crossings includes: In a first crossing, every two crossing units in a plurality of crossing units from the two sides to the middle in the radial direction form a crossing group. Arrangement orders of two crossing units in each crossing group in the radial direction are interchanged. When remaining crossing units cannot be equally divided into two groups and a quantity of the remaining crossing units is 2, arrangement orders of two crossing units in the radial direction are interchanged. When remaining crossing units cannot be equally divided into two groups and a quantity of the remaining crossing units is 3, an arrangement order of a crossing unit in the middle in the radial direction remains unchanged, and arrangement orders of the other two crossing units in the radial direction are interchanged. In a second crossing, arrangement orders of a plurality of crossing units in each crossing group remain unchanged, an arrangement order of a crossing group or crossing unit in the middle remains unchanged, and arrangement orders of two crossing groups on the two sides in the radial direction are interchanged.

Figure 14A:
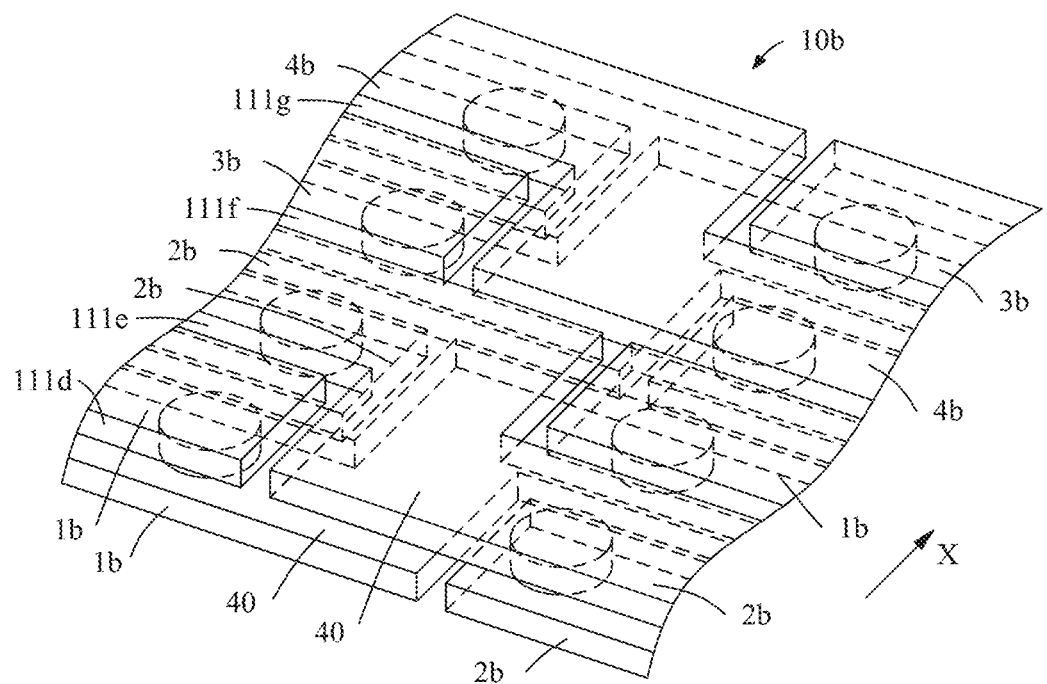
FIG. 14a is a schematic diagram of a first crossing of a wireless charging coil corresponding to FIG. 12b.
Figure 14B:
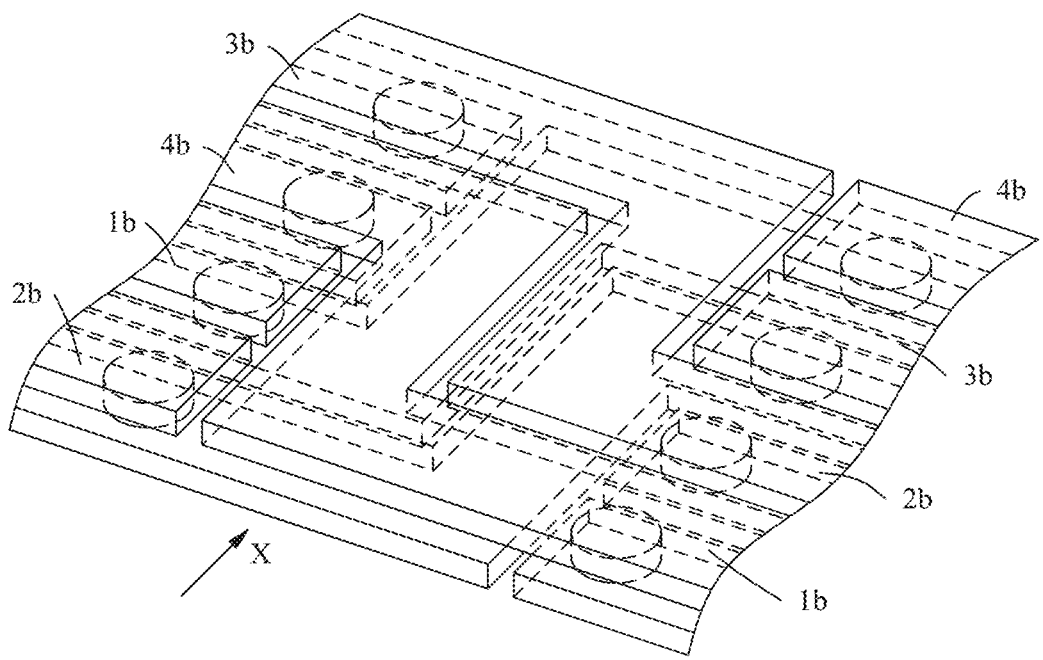
FIG. 14b is a schematic diagram of a second crossing of a wireless charging coil corresponding to FIG. 12b.

For example, as shown in FIG. 12b, FIG. 14a, and FIG. 14b, in another embodiment, a coil group 10b in a first area includes eight coils, and every four coils are distributed at a same layer. In the direction X, an arrangement order of two coils 111d disposed at the two layers is 1, and each coil 111d includes two wire parts 1b; an arrangement order of two coils 111e disposed at the two layers is 2, and each coil 111e includes two wire parts 2b; an arrangement order of two coils 111f disposed at the two layers is 3, and each coil 111f includes two wire parts 3b; and an arrangement order of two coils 111g disposed at the two layers is 4, and each coil 111g includes two wire parts 4b.

In a first crossing, a crossing unit formed by the two coils 111d in the arrangement order 1 and a crossing unit formed by the two coils 111e in the arrangement order 2 form a crossing group, and orders are interchanged. A crossing unit formed by the two coils 111f in the arrangement order 3 and a crossing unit formed by the two coils 111g in the arrangement order 4 form a crossing group, and orders are interchanged. In a second crossing, orders of two crossing groups of the coil group 10b are interchanged. An order of two crossing units in a crossing group remains unchanged. Through two crossings, a sequence arrangement of four crossing units in the radial direction is changed to a reverse sequence arrangement.

A crossing manner of the coil group 10b is the same as a crossing manner of the coil group 10 shown in FIG. 7.

FIG. 12c is a schematic diagram of a crossing of a coil group 10c including ten coils. Every five coils are distributed at a same layer, two crossing groups are formed, and one crossing unit remains. In a first crossing, orders of two crossing units in a crossing unit are interchanged, and an order of a remaining crossing unit remains unchanged. In a second crossing, orders of the two crossing groups are interchanged. An order of a crossing unit in the middle remains unchanged.

Figure 12E:
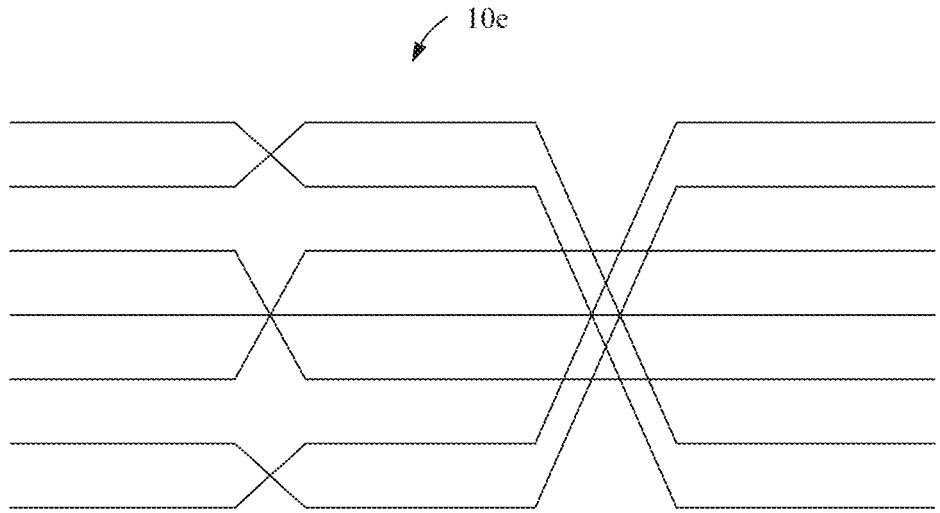

When a quantity of coils is separately 12 and 14, a coil group 10d shown in FIG. 12d and a coil group 10e shown in FIG. 12e can be separately obtained based on the foregoing principle of two crossings.

Figure 12F:
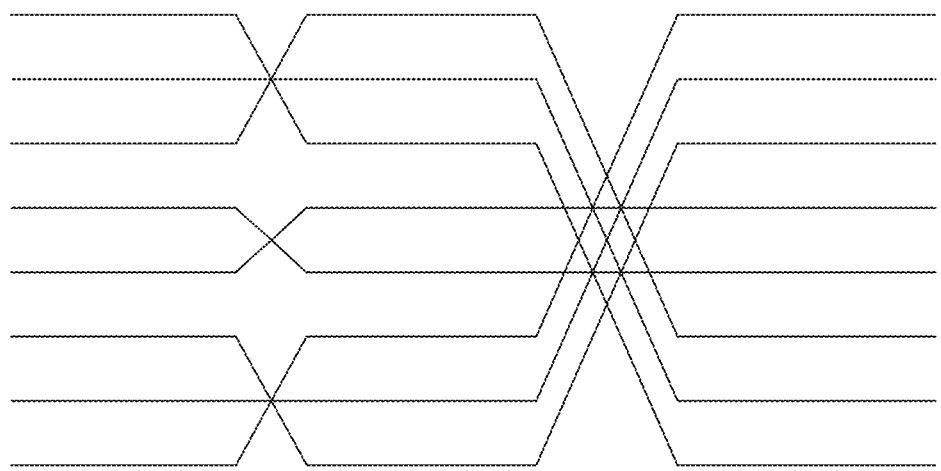
Figure 12G:
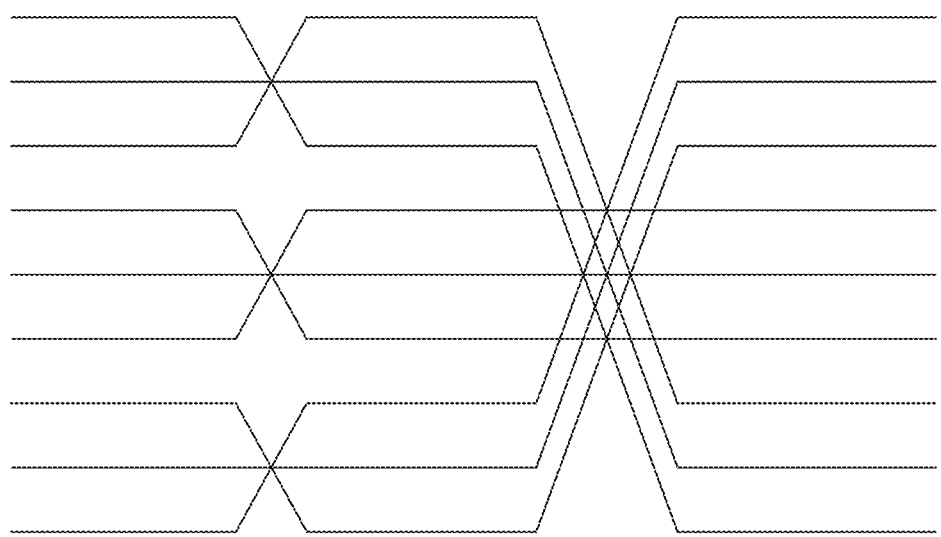

Referring to FIG. 12f and FIG. 12g, when t meets 7<t≤9, in a first crossing, every three crossing units in a plurality of crossing units from the two sides to the middle in the radial direction form a crossing group. An arrangement order of a crossing unit in the middle of each crossing group in the radial direction remains unchanged, and arrangement orders of two crossing units on the two sides in the radial direction are interchanged. As shown in FIG. 12f, when remaining crossing units cannot be equally divided into two groups and a quantity of the remaining crossing units is 2, arrangement orders of two crossing units in the radial direction are interchanged. As shown in FIG. 12g, when remaining crossing units cannot be equally divided into two groups and a quantity of the remaining crossing units is 3, an arrangement order of a crossing unit in the middle in the radial direction remains unchanged, and arrangement orders of the other two crossing units in the radial direction are interchanged. In a second crossing, arrangement orders of a plurality of crossing units in each crossing group remain unchanged, an arrangement order of a crossing group or crossing unit in the middle remains unchanged, and arrangement orders of two crossing groups on the two sides in the radial direction are interchanged.

When a quantity of coils is separately 16 and 18, a coil group of FIG. 12f and a coil group shown in FIG. 12g can be separately obtained based on the foregoing principle of two crossings.

Figure 15:
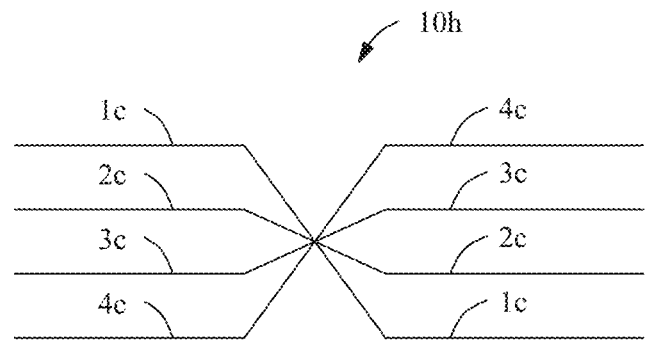
FIG. 15 and FIG. 16 are respectively schematic diagrams of different other crossings a wireless charging coil according to this application.

A plurality of coils of a coil group are not limited to the foregoing crossing manner in which a sequence arrangement of the plurality of coils is changed to a reverse sequence arrangement in the radial direction. For example, as shown in FIG. 15, in another embodiment, arrangement orders (consistent with arrangement orders of a wire part 1a, a wire part 2c, a wire part 3c, and a wire part 4c) of wire parts of four coils of a coil group 10h from inside to outside in the radial direction are 1, 2, 3, and 4, and after a crossing, arrangement orders of a plurality of coils in the radial direction are 4, 3, 2, and 1.

Figure 16:
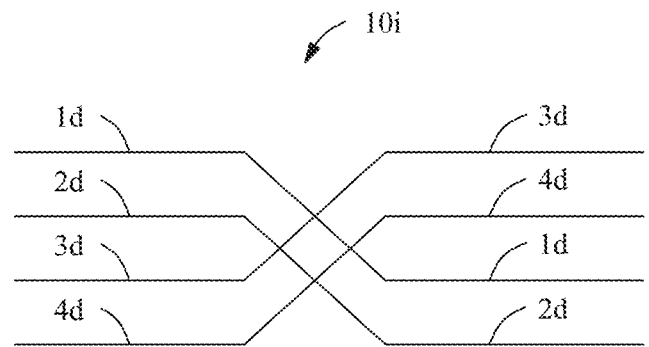

A crossing manner of the plurality of coils of the coil group is not limited to a manner in which a sequence is changed to a reverse sequence. For example, as shown in FIG. 16, in another embodiment, arrangement orders (consistent with arrangement orders of a wire part 1d, a wire part 2d, a wire part 3d, and a wire part 4d) of wire parts of four coils of a coil group 10g from inside to outside in the radial direction are 1, 2, 3, and 4, and after a crossing, arrangement orders of a plurality of coils in the radial direction are 3, 4, 1, and 2.

It may be understood that, in another embodiment, in the first area 103 of the wireless charging coil 100, a plurality of coils 111 in one, two, or all coil groups 10 may cross, so that an arrangement order of coils 111 in the radial direction may be changed, and current distribution uniformity of the coil group 10 may be improved.

It may be understood that, in another embodiment, a quantity of coils 111 of the coil group 10 in the first area 103 may also be an odd number, and a width of a coil 11 at the first layer 101 and that at the second layer 102 are set to be different, so that total widths of coils 111 at the two layers are equal.

Figure 17:
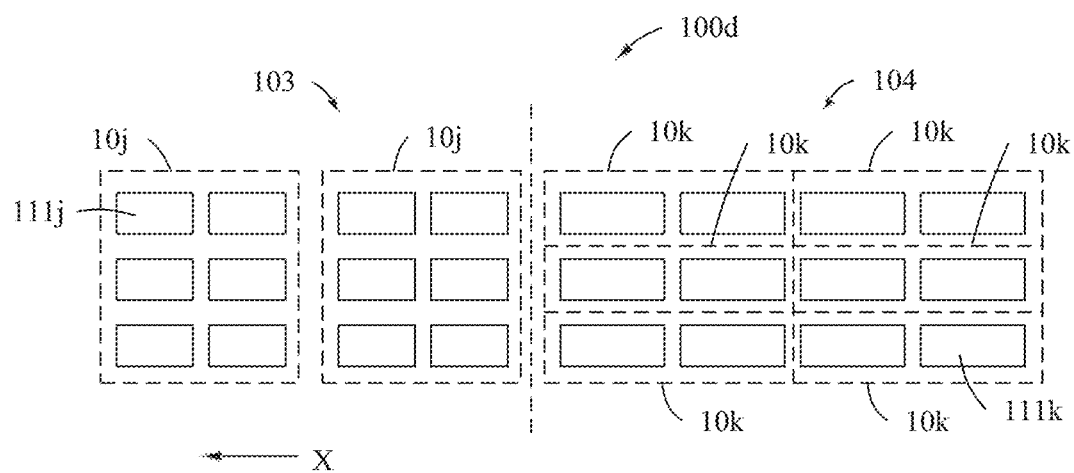
FIG. 17 is a schematic diagram of the wireless charging coil shown in FIG. 7 with different quantities of layers and different quantities of coils according to another embodiment.

It may be understood that a quantity of layers of the wireless charging coil is not limited to two layers, and may be three layers, four layers, five layers, or the like. For example, as shown in FIG. 17, a difference between a wireless charging coil 100d and the wireless charging coil 100 lies in that the wireless charging coil 100d includes eight coil groups wound at three layers. Two coil groups 10j are disposed in the first area 103, and six coil groups 10k are uniformly distributed at the three layers in the second area 104. Each coil group 10j in the first area 103 includes six coils 111j, and every two coils 111j are disposed at a same layer. Each coil 10k in the second area 104 includes two coils 111k disposed at a same layer.

A quantity of coil groups 10k in the second area 104 is twice the quantity of layers, but is not limited thereto. For example, when a quantity of coil groups 10k in the second area 104 is five, and two coil groups 10k are disposed at each layer in two layers, a remaining coil group 10k whose width is increased is disposed at the other layer. When a quantity of layers of the wireless charging coil is greater than 2, a crossing solution of two adjacent layers is the same as a crossing solution of a plurality of coils at the two layers of the wireless charging coil 100.

It may be understood that the wireless charging coil 100 may further be used as a structure of an antenna (not shown in the figure). For example, when the wireless charging coil 100 is used as an antenna in an electronic device such as a mobile phone or a tablet computer, the wireless charging coil 100 generates an electromagnetic field when conducting an alternating current. Based on a near field communication (Near Field Communication, NFC) technology, the electronic device may exchange data with another device that uses the near field communication technology, to implement mobile payment, electronic ticketing, access control, mobile identity recognition, and anti-counterfeiting.

Current distribution uniformity of the wireless charging coil 100 is relatively high. When the wireless charging coil 100 is applied to an antenna, efficiency of the antenna is improved.

In the foregoing wireless charging coil 100, a coil group 10 in which current distribution is not uniform and that is in the first area 103 uses a plurality of coils 111 that are connected in parallel and distributed at a plurality of layers, so that current density in coils 111 in the first area 103 is distributed at the plurality of layers, thereby improving current distribution uniformity.

The foregoing embodiments are merely intended to describe the technical solutions of this application, but are not intended to constitute limitations. Although this application is described in detail with reference to preferred embodiments, persons of ordinary skill in the art should understand that the technical solutions of this application may be modified or equivalent replaced without departing from the spirit and essence of the technical solutions of this application.

What is claimed is:

1. A wireless charging coil, comprising a plurality of coil groups that are disposed at a plurality of layers and that are connected in series, and an insulation layer that is disposed between two layers of the plurality of coil groups, wherein:
   the wireless charging coil comprises a first area and a second area that is disposed at an outer periphery of the first area;
   a plurality of coil groups disposed in the second area are arranged at the plurality of layers, and each coil group comprises a plurality of coils wound in parallel at one layer; and
   each coil group disposed in the first area comprises a plurality of coils connected in parallel, and a quantity of coils of the coil group at each layer is the same.

2. The wireless charging coil according to claim 1, wherein a quantity of coil groups in the first area is M, and a quantity of coil groups in the first area and the second area is N, wherein M and N meet: N−M≥2 and M≤i+2, and i is an integer obtained after N is divided by 2 and rounded down.

3. The wireless charging coil according to claim 2, wherein when 3≤N≤4, M>0; and when N>4, M≥i−2.

4. The wireless charging coil according to claim 1, wherein a quantity of coils at each layer of the coil group in the first area is t, and two coil groups adjacently connected in series are correspondingly connected by using t coils.

5. The wireless charging coil according to claim 1, wherein a quantity of the coil groups in the second area is an integer multiple of a quantity of layers at which the plurality of coil groups are distributed.

6. The wireless charging coil according to claim 1, wherein when a difference between quantities of coil groups at two adjacent layers in the second area is greater than or equal to 1, a width sum of a plurality of coils of a coil group at a layer at which a quantity of coil groups is smaller is greater than a width sum of a plurality of coils of a coil group at the other layer.

7. The wireless charging coil according to claim 1, wherein a width sum of the plurality of coils of each coil group in the second area is greater than or equal to a width sum of a plurality of coils at a single layer of each coil group in the first area.

8. The wireless charging coil according to claim 7, wherein in a direction by which the second area faces the first area, a width sum of a plurality of coils of any two coil groups in the first area is decreased or remains unchanged.

9. The wireless charging coil according to claim 1, wherein an arrangement order of coils of at least one coil group in the first area in a radial direction of the wireless charging coil is changed.

10. The wireless charging coil according to claim 9, wherein coils in the first area comprise a plurality of wire parts, and the wireless charging coil further comprises a first connection part and a second connection part;
the first connection part passes through the insulation layer, and a plurality of wire parts that are stacked at the plurality of layers and that are in a same arrangement order in the radial direction are connected by using the first connection part and form a wire part group; and
two ends of the second connection part are separately connected to two wire part groups that are in different arrangement orders in the radial direction, so that the plurality of wire parts of the coil are connected.

11. The wireless charging coil according to claim 9, wherein a plurality of coil arrays of the coil group are uniformly distributed at at least two layers, and two crossings enable an arrangement order of a plurality of coils in the radial direction to be reversed; and a plurality of coils that are stacked at the at least two layers and that are in a same arrangement order in the radial direction form a crossing unit; and
when a quantity t of coils at a single layer of the coil group meets $3<t\leq7$, in a first crossing, every two crossing units in a plurality of crossing units from two sides to the middle in the radial direction form a crossing group, arrangement orders of two crossing units in each crossing group in the radial direction are interchanged, and when remaining crossing units cannot be equally divided into two groups and a quantity of the remaining crossing units is 2, arrangement orders of two crossing units in the radial direction are interchanged; when remaining crossing units cannot be equally divided into two groups and a quantity of the remaining crossing units is 3, an arrangement order of a crossing unit in the middle in the radial direction remains unchanged, and arrangement orders of the other two crossing units in the radial direction are interchanged; and in a second crossing, arrangement orders of a plurality of crossing units in each crossing group remain unchanged, an arrangement order of a crossing group or crossing unit in the middle remains unchanged, and arrangement orders of two crossing groups on the two sides in the radial direction are interchanged.

12. The wireless charging coil according to claim 9, wherein a plurality of coil arrays of the coil group are uniformly distributed at at least two layers, and two crossings enable an arrangement order of a plurality of coils in the radial direction to be reversed; and a plurality of coils that are stacked at the at least two layers and that are in a same arrangement order in the radial direction form a crossing unit; and
when a quantity t of coils at a single layer of the coil group meets $7<t\leq9$, in a first crossing, every three crossing units in a plurality of crossing units from two sides to the middle in the radial direction form a crossing group; an arrangement order of a crossing unit in the middle of each crossing group in the radial direction remains unchanged, and arrangement orders of two crossing units on the two sides in the radial direction are interchanged; when remaining crossing units cannot be equally divided into two groups and a quantity of the remaining crossing units is 2, arrangement orders of two crossing units in the radial direction are interchanged; when remaining crossing units cannot be equally divided into two groups and a quantity of the remaining crossing units is 3, an arrangement order of a crossing unit in the middle in the radial direction remains unchanged, and arrangement orders of the other two crossing units in the radial direction are interchanged; and in a second crossing, arrangement orders of a plurality of crossing units in each crossing group remain unchanged, an arrangement order of a crossing group or crossing unit in the middle remains unchanged, and arrangement orders of two crossing groups on the two sides in the radial direction are interchanged.

13. The wireless charging coil according to claim 1, wherein a quantity of coils of the coil group in the second area is t, a quantity of coils of the coil group in the first area is t, and two coil groups that are adjacently connected in series and that are of the wireless charging coil are correspondingly connected by using t coils.

14. The wireless charging coil according to claim 13, wherein a wire slot is disposed on at least one coil in the second area, so that the coil forms a plurality of sub-coils.

15. The wireless charging coil according to claim 13, wherein at least two adjacent coils in at least one coil group in the second area are combined into a new coil.

16. An electronic device, wherein the electronic device comprises a wireless charging coil, wherein the wireless charging coil comprising:
a plurality of coil groups that are disposed at a plurality of layers and that are connected in series, and an insulation layer that is disposed between two layers of the plurality of coil groups, wherein
the wireless charging coil comprises a first area and a second area that is disposed at an outer periphery of the first area;
a plurality of coil groups disposed in the second area are arranged at the plurality of layers, and each coil group comprises a plurality of coils wound in parallel at one layer; and
each coil group disposed in the first area comprises a plurality of coils connected in parallel, and a quantity of coils of the coil group at each layer is the same.

* * * * *